(12) United States Patent
Wu et al.

(10) Patent No.: US 11,418,476 B2
(45) Date of Patent: Aug. 16, 2022

(54) METHOD AND APPARATUS FOR DETECTING FAKE NEWS IN A SOCIAL MEDIA NETWORK

(71) Applicant: Arizona Board of Regents on Behalf of Arizona State University, Scottsdale, AZ (US)

(72) Inventors: Liang Wu, Tempe, AZ (US); Huan Liu, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 167 days.

(21) Appl. No.: 16/435,064

(22) Filed: Jun. 7, 2019

(65) Prior Publication Data
US 2019/0379628 A1    Dec. 12, 2019

Related U.S. Application Data

(60) Provisional application No. 62/682,130, filed on Jun. 7, 2018.

(51) Int. Cl.
*G06N 3/08* (2006.01)
*H04L 51/52* (2022.01)
(Continued)

(52) U.S. Cl.
CPC .......... *H04L 51/32* (2013.01); *G06F 16/2365* (2019.01); *G06N 3/0445* (2013.01); *G06N 3/08* (2013.01); *H04L 51/12* (2013.01)

(58) Field of Classification Search
CPC ......... H04L 51/32; H04L 51/12; G06N 20/20; G06N 3/0445; G06N 3/08; G06N 7/005;
(Continued)

(56) References Cited

U.S. PATENT DOCUMENTS 9,544,381 B2    1/2017  Zafarani et al.
2014/0324741 A1 * 10/2014  Stewart ................. G06N 20/00
                                                      706/46
(Continued)

FOREIGN PATENT DOCUMENTS

WO        2020061578 A1    3/2020

OTHER PUBLICATIONS

Nilizadeh et al., POISED: Spotting Twitter Spam Off the Beaten Paths, (Year: 2017).*
(Continued)

*Primary Examiner* — Yves Dalencourt
*Assistant Examiner* — Kidest Mendaye
(74) *Attorney, Agent, or Firm* — Elliott, Ostrander & Preston, P.C.

(57) ABSTRACT

Messages are transmitted in a social media network. Embeddings of social media network users in the social media network are inferred. Propagation pathways over which the plurality of messages are transmitted through the social media network are classified. Action is taken on one or more of the messages that are transmitted through the social media network, based on the classification of the propagation pathways over which the messages are transmitted through the social media network and the inferred embeddings of the social media network users.

12 Claims, 8 Drawing Sheets

(51) Int. Cl.
   *G06F 16/23* (2019.01)
   *H04L 51/00* (2022.01)
   *G06N 3/04* (2006.01)

(58) Field of Classification Search
   CPC .......... G06F 16/24578; G06F 16/9024; G06F 16/2365; G06F 16/355; G06F 17/30; G06F 16/353; G06F 40/211
   See application file for complete search history.

(56) References Cited

U.S. PATENT DOCUMENTS

| | | | | |
|---|---|---|---|---|
| 2014/0358930 | A1* | 12/2014 | Lerman | G06F 16/353 707/740 |
| 2015/0120583 | A1* | 4/2015 | Zarrella | G06Q 50/01 705/317 |
| 2015/0120717 | A1* | 4/2015 | Kim | G06F 16/335 707/727 |
| 2015/0134579 | A1* | 5/2015 | Zaman | G06N 20/00 706/12 |
| 2016/0358221 | A1* | 12/2016 | Khare | H04N 21/4886 |
| 2017/0004403 | A1 | 1/2017 | Gundecha et al. | |
| 2017/0212943 | A1 | 7/2017 | Li et al. | |
| 2017/0213153 | A1 | 7/2017 | Wang et al. | |
| 2017/0309202 | A1* | 10/2017 | Chen | G09B 19/06 |
| 2018/0365562 | A1* | 12/2018 | Volkova | G06N 3/0445 |
| 2019/0179861 | A1* | 6/2019 | Goldenstein | G06F 16/9535 |
| 2019/0236148 | A1* | 8/2019 | DeFelice | G06F 40/216 |
| 2020/0019840 | A1 | 1/2020 | Guo et al. | |
| 2020/0065292 | A1 | 2/2020 | Li et al. | |
| 2021/0049441 | A1* | 2/2021 | Bronstein | G06N 3/08 |

OTHER PUBLICATIONS

U.S. Appl. No. 16/525,148, filed Jul. 29, 2019, Shu et al.
U.S. Appl. No. 16/782,349, filed Feb. 5, 2020, Beigi et al.
Barbier, G., et al, "Provenance Data in Social Media," Synthesis Lectures on Data Mining and Knowledge Discovery, vol. 4, No. 1 (2013), pp. 1-84.
Blondel, V. D., et al., "Fast unfolding of communities in large networks," Journal of Statistical Mechanics: Theory and Experiment, vol. 10 (2008), p. 10008.
Cao, N., et al., "TargetVue: Visual Analysis of Anomalous User Behaviors in Online Communication Systems," IEEE Transactions on Visualization and Computer Graphics, vol. 22, No. 1, (2016), pp. 280-289.
Centola, D., "The Spread of Behavior in an Online Social Network Experiment," Science, vol. 329, No. 5996, (2010), pp. 1194-1197.
Chen, T., et al., "Xgboost: A Scalable Tree Boosting System," International Conference on Knowledge Discovery and Data Mining, ACM, (2016), pp. 785-794.
Cho, K., et al., "Learning Phrase Representaions Using RNN Encoder-decoder for Statistical Machine Translation," arXiv Preprint, arXiv 1406.1078 (2014), 15 pages.
Clarke, L., "On Cayley's Formula for Counting Trees," Journal of the London Mathematical Society, vol. 1, No. 4, (1958), pp. 471-474.
Del Vicario, M., et al., "The Spreading of Misinformation Online," Proceedings of the National Academy of Sciences, vol. 113, No. 3 (2016), pp. 554-559.
Gu, G., et al., BotSniffer: Detecting Botnet Command and Control Channels in Network Traffic, (2008), 18 pages.
Hallac, D., et al., "Network Lasso: Clustering and Optimization in Large Graphs," Proceedings of the 21st ACM SIGKDD International Conference on Knowledge Discovery and Data Mining, ACM (2015), pp. 387-396.
Joachims, T., "Text Categorization with Support Vector Machines: Learning with Many Relevant Features," European Conference on Machine Learning, Springer, (1998), pp. 137-142.
Kempe, D., et al., "Maximizing the Spread of Influence Through a Social Network," Proceedings of the Ninth ACM SIGKDD International Conference on Knowledge Discovery and Data Mining, ACM, (2003), pp. 137-146.
Kermack, W. O., et al., "A Contribution to the Mathematical Theory of Epidemics," Proceedings of the Royal Society of London A: Mathematical, Physical and Engineering Sciences, vol. 115, (1927), pp. 700-721.
Kim, Y., "Convolutional Neural Networks for Sentence Classification," arXiv preprint arXiv:1408.5882, vol. 2, (Sep. 3, 2014), 6 pages.
Kwon, S., et al., "Rumor Detection over Varying Time Windows," PLoS ONE 12(1): e0168344. https://doi.org/10.1371/journal.pone 0168344 (2017), 19 pages.
Lee, D. D., et al., "Algorithms for Non-Negative Matrix Factorization," Advances in Neural Information Processing Systems, (2001), pp. 556-562.
Li, J., et al., "Attributed Network Embedding for Learning in a Dynamic Environment," arXiv Preprint arXiv: 1706.01860 (2017), 10 pages.
Li, J., et al., "Robust Unsupervised Feature Selection on Networked Data," Proceedings of the 2016 SIAM International Conference on Data Mining, SIAM, (2016), pp. 387-395.
Li, J., et al., "Streaming Link Prediction on Dynamic Attributed Networks," Proceedings of 11th ACM International Conference on Web Search and Data Mining, ACM, (2018), 9 pages.
Li, J., et al., "Toward Personalized Relational Learning," Proceedings of the 2017 SIAM International Conference on Data Mining, SIAM (2017), pp. 444-452.
Li, J., et al., "Unsupervised Personalized Feature Selection," Proceedings of the 32nd AAAI Conference on Artificial Intelligence, AAAI, (2018), 8 pages.
Ma, J., et al., "Detect Rumors Using Time Series of Social Context Information on Microblogging Websites," CIKM, (2015), 4 pages.
Manning, C., et al., "The Stanford CoreNLP Natural Language Processing Toolkit," Association for Computational Linguistics (ACL) System Demonstrations, (2014), pp. 55-60.
Moore, J., et al., "Deep Collective Inference," Proceedings of the 31st AAAI Conference on Artificial Intelligence, (2017), 9 pages.
Morstatter, F., et al., "A New Approach to Bot Detection: Striking the Balance Between Precision and Recall," Advances in Social Networks Analysis and Mining, IEEE/ACM International Conference On, (2016), pp. 533-540.
Palangi, H., et al., "Deep Sentence Embedding Using Long Short-term Memory Networks: Analysis and Application to Information Retrieval," IEEE/ACM Transactions on Audio, Speech and Language Processing, vol. 24, No. 4, (2016), pp. 694-707.
Perozzi, B., et al., "Deepwalk: Online Learning of Social Representations," International Conference on Knowledge Discovery and Data Mining, ACM, (2014), pp. 701-710.
Qazvinian, V., et al., "Rumor Has It: Identifying Misinformation in Microblogs," Proceedings of the Conference on Empirical Methods in Natural Language Processing, Association for Computational Linguistics, (2011), pp. 1589-1599.
Rodriguez, M. G., et al., "Inferring Networks of Diffusion and Influence," Proceedings of the 16th ACM SIGKDD International Conference on Knowledge Discovery and Data Mining, ACM, pp. 1019-1028.
Sampson, J., et al., "Leveraging the Implicit Structure within Social Media for Emergent Rumor Detection," Proceedings of the 25th ACM International Conference on Information and Knowledge Management, (Oct. 24-28, 2016), pp. 2377-2381, Indianapolis, Indiana, USA.
Shu, K., et al., "Fake News Detection on Social Media: A Data Mining Perspective," ACM SIGKDD Explorations Newsletter, vol. 19, No. 1 (2017), pp. 22-36.
Socher, R., et al., Recursive Deep Models for Semantic Compositionality Over a Sentiment Treebank, Proceedings of the Conference on Empirical Methods in Natural Language Processing, EMNLP, vol. 1631, Citeseer 1642 (2013), 12 pages.
Tang, J., et al., "Line, Large-scale Information Network Embedding," Proceedings of the 24th International Conference on World Wide Web, ACM (2015) pp. 1067-1077.

(56) References Cited

OTHER PUBLICATIONS

Tang, L., et al., "Relational Learning Via Latent Social Dimensions," Proceedings of the 15th ACM SIGKDD International Conference on Knowledge Discovery and Data Mining, ACM (2009), pp. 817-826.
Tian, F., et al., "Learning Deep Representations for Graph Clustering," AAAI (2014) pp. 1293-1299.
Wu, L., et al., "Adaptive Spammer Detection with Sparse Group Modeling," ICWSM, (2017) pp. 319-326.
Wu, L., et al., "Detecting Camouflaged Content Polluters," ICWSM, (2017), pp. 696-699.
Wu, L., et al., "Detecting Crowdturfing in Social Media," Encyclopedia of Social Network Analysis and Mining, (2017), 12 pages.
Wu, L., et al., "Gleaning Wisdom from the Past: Early Detection of Emerging Rumors in Social Media," Proceedings of the 2017 SIAM International Conference on Data Mining, SIAM, (2017), pp. 99-107.
Wu, L., et al., "Mining Misinformation in Social Media," Big Data in Complex and Social Networks (2016), pp. 123-152.
Wu, L., et al., "Relational Learning with Social Status Analysis," Proceedings of the Ninth ACM International Conference on Web Search and Data Mining, ACM (2016) pp. 513-522.
Yanardag, P., et al., "Deep Graph Kernels," Proceedings of the 21th ACM SIGKDD International Conference on Knowledge Discovery and Data Mining, ACM, (2015), pp. 1365-1374.
Yang, J., et al., "Community Detection in Networks with Nodes Attributes," Data Mining ICDM IEEE 2013 13th International Conference on IEEE, (2013) pp. 1151-1156.

* cited by examiner

METHOD AND APPARATUS FOR DETECTING FAKE NEWS IN A SOCIAL MEDIA NETWORK

CROSS-REFERENCE TO RELATED APPLICATIONS

This US nonprovisional patent application claims priority to U.S. provisional patent application No. 62/682,130, filed Jun. 7, 2018, the entire contents of which are incorporated herein by reference.

STATEMENT REGARDING FEDERALLY SPONSORED RESEARCH

This invention was made with government support under the Office of Naval Research grant N00014-13-1-0835. The government has certain rights in the invention.

TECHNICAL FIELD

Embodiments of the invention relate to a method and apparatus for detecting and classifying messages in a social media network, for example, detecting and classifying messages into categories of interest, such as real news or fake news.

BACKGROUND

When a message, such as a piece of news, spreads in social media networks (or, simply, "social network"), one question is how can it be classified into categories of interests, such as genuine (i.e., real) or fake news? Classification of social media content is an important task for social media mining, and most prior art methods regard it as a text categorization problem and mainly focus on using content features, such as words and hashtags. However, for many emerging applications like fake news and rumor detection, it is very challenging, if not impossible, to identify useful features based on content of the message. For example, intentional spreaders of fake news may manipulate the content to make it look like real news.

As the number and size of online social networks continue to grow, social networking sites have become an attractive platform to facilitate the spread of information. A recent study from Pew Research claims that 62% of adults get their news from social media in United States, with 29% among them doing so very often. Concomitant with the expansive and varied sources of data are the challenges for personalizing the massive amount of information and filtering out unwanted messages such as fake news and spam. However, the sparse and noisy social media content makes it difficult for prior art approaches, which heavily rely on content features, to tackle these challenges. What is needed is solutions that personalize the large amounts of information and filter out unwanted messages such as fake news and at the same time improve the computer's efficiency since content-based approaches require more CPU processing and memory resources and take more time to process.

SUMMARY

Network diffusion classification in a social media network involves obtaining embeddings of users in the social media network based on network connectivity, wherein the obtained embeddings of users utilizes the social identity of a user of the social media network to infer the social media messages the user spreads in the social media network, constructing a sequence classifier to model a sequence of users that spread a social media message, and predicting a class label associated with the social media message.

WRITTEN DESCRIPTION

1. Introduction

Embodiments of the invention involve modeling the propagation of messages in a social media network, or simply, social network. Specifically, embodiments of the invention (1) infer embeddings of social media network, or simply, social media, users with social network structures; and (2) classify propagation pathways of a message, for example, using an LSTM-RNN to represent and classify the propagation pathways. Since content information is sparse and noisy on social media, embodiments of the invention provide a high degree of classification accuracy even in the absence of, or without relying on, content information. Experimental results of embodiments of the invention on real-world datasets show the superiority over prior art approaches on the task of fake information detection and information categorization, e.g., fake news detection and news categorization.

Figure 3A:
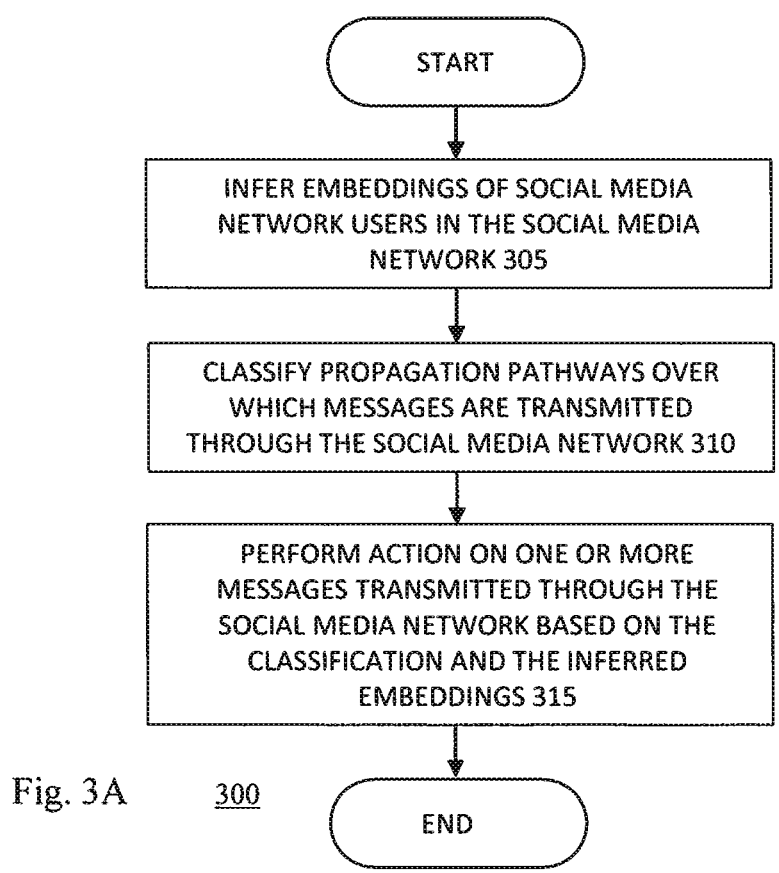
FIG. 3A is a flow diagram of program logic in accordance with an embodiment of the invention.

With reference to FIG. 3A, and as will be described in more detail below, embodiments of the invention 300 include program logic applied to messages transmitted in a social media network, the logic at 305 inferring embeddings of social media network users in the social media network, the logic at 310 classifying propagation pathways over which the messages are transmitted through the social media network, and the logic at 315 taking some action on one or more of the messages that are transmitted through the social media network based on the classification of the propagation pathways over which the messages are transmitted through the social media network and the inferred embeddings of the social media network users. For example, the action might involve filtering out the one or more of the messages that are transmitted over a propagation pathway that is classified as a fake news propagation pathway.

Figure 3B:
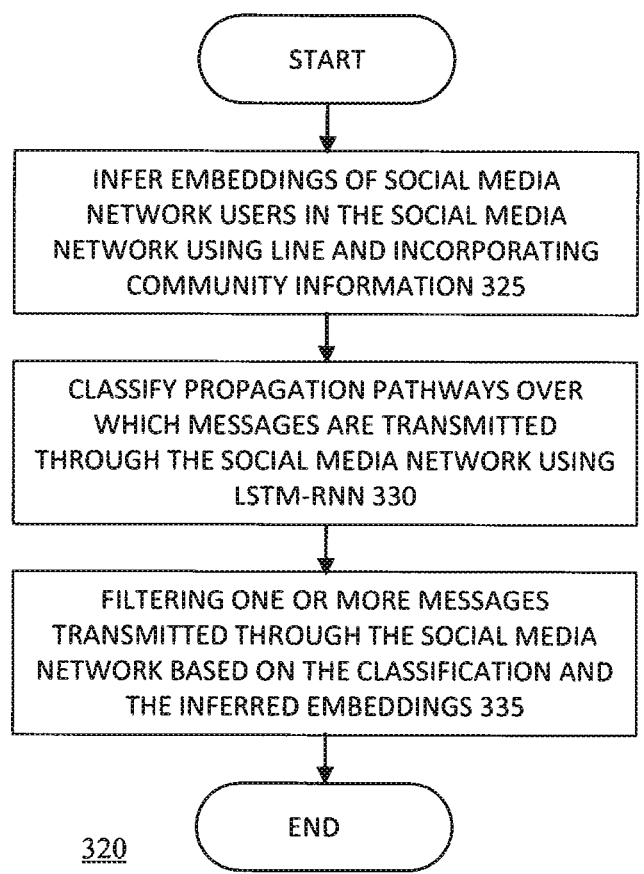
FIG. 3B is a flow diagram of program logic in accordance with an embodiment of the invention.

With reference to FIG. 3B, according to the described embodiments 320, program logic 325 for inferring embeddings of social media network users in the social media network can infer embeddings of social media network users using Large-Scale Information Network Embedding (LINE) and also by incorporating community information. Further, the program logic 330 for classifying propagation pathways of the messages classify the propagation pathways of the messages using a Long Short-Term Memory Recurrent Neural Network (LSTM-RNN). According to some embodiments, the program logic for classifying propagation pathways of the messages classify the propagation pathways of the messages as a pathway for spreading fake news or spam, or a pathway for spreading legitimate, genuine, or real news. Logic 335 filters the one or more of the messages that are transmitted over a propagation pathway that is classified as a fake news propagation pathway, and alternatively allows continued transmission of messages that are transmitted over a propagation pathway that is classified as real news.

Embodiments of the invention focus on the diffusion, or spread, of information. A primary force behind the diffusion of information is its spreaders. People tend to spread information that caters to their interests, fits their system of belief, and confirms their biases. Hence, similar messages usually lead to similar pathways, or traces, of information diffusion: similar messages are more likely to be spread from and by similar sources, by similar people and in similar sequences. Since the diffusion of information is pervasively available on social networks, embodiments of the invention consider how the traces of information diffusion in terms of spreaders can be exploited to classify or categorize a message. The message can be a piece of news, a story or a meme that has been posted and forwarded in social networks, and those users who post or forward it are the spreaders. Traces of a message refer to by whom and when the message is spread, i.e., posted or forwarded in the social network.

Embodiments of the invention classify social media messages with diffusion network information. Embodiments of the invention take traces of a message as input, and outputs its category, or classification. Consider the huge number of social media users and all the possible combinations of spreaders, traces will be of high dimensionality and thus may result in sparsity in the feature space. To cope with the problem, embodiments of the invention utilize the proximity of nodes (i.e., users) and social dimensions manifested in the social network to capture the intrinsic characteristics of social media users in a myriad of applications.

Figure 4:
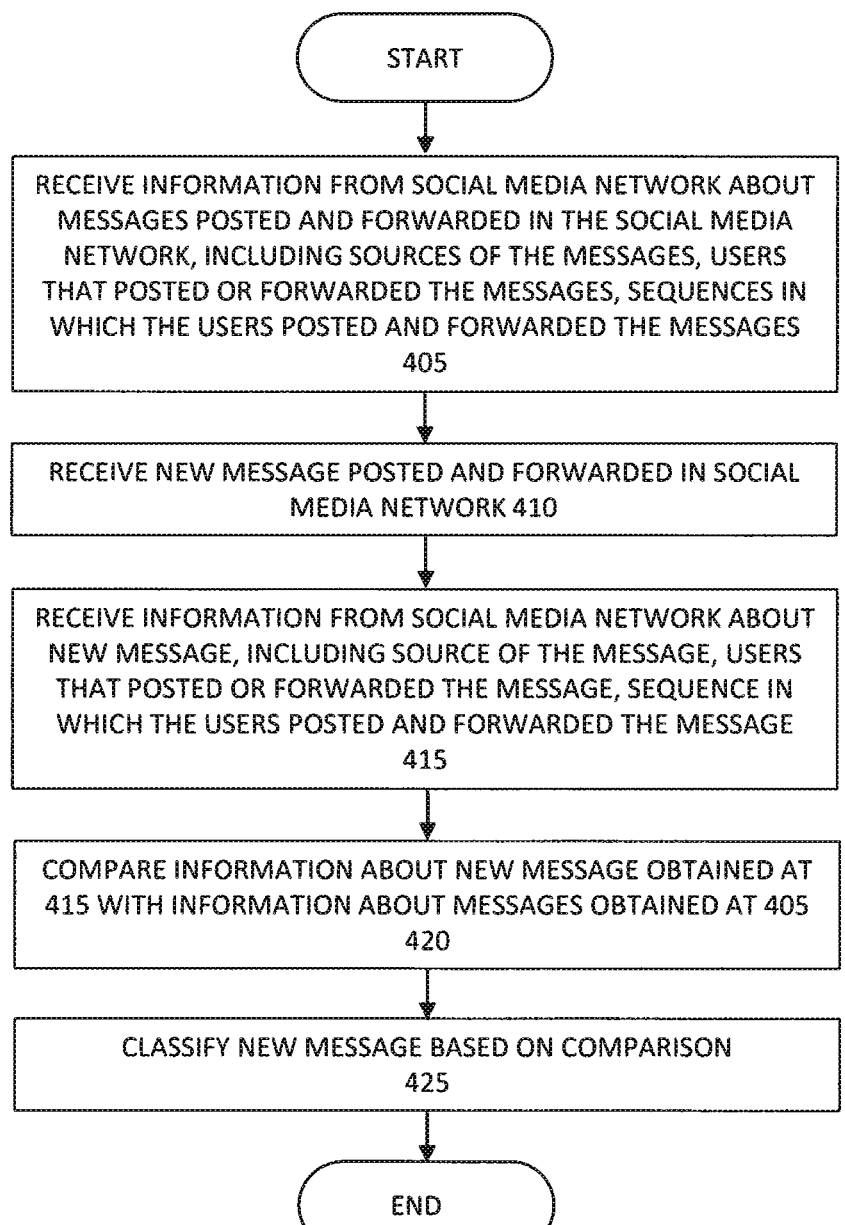
FIG. 4 is a flow diagram of program logic in accordance with an embodiment of the invention.

Thus, as will be described in more detail below, and with reference to FIG. 4, embodiments of the invention 400 include program logic to classify a message posted and forwarded in a social media network. The program logic 405 receives from the social media network information about messages posted and forwarded in the social media network, including one or more sources of the messages, the social media network users that posted or forwarded the messages in the social media network, and the sequences in which the social media network users posted or forwarded the plurality of messages in the social media network. The program logic 410 receives a new message posted and forwarded in the social media network. Program logic 415 further receives from the social media network information about the new message posted and forwarded in the social media network, including the source of the new message, the social media network users that posted or forwarded the new message in the social media network, and the sequence in which the social media network users posted or forwarded the new message in the social media network. The program logic 420 then compares the information about the new message with the information about all the other messages posted and forwarded in the social media network, and logic at 425 classifies the new message based on the comparison.

In one embodiment, the program logic for comparing the information about the new message to the information about existing messages in the social media network provides information about the new message as input to an LSTM-RNN model that is trained with the information about the existing messages. The logic produces an output from the LSTM-RNN model and classifies the new message based on the output of the LSTM-RNN model. According to one embodiment, the program logic for classifying the new message classifies the new message as one of fake news, spam, or real news. The logic can then take appropriate action on the new message based on its classification, such as allowing the message to be forwarded by a social media network user in the social media network, or removing the new message from the social media network.

To demonstrate embodiments of the invention on real-world applications, the embodiments are evaluated and compared to prior-art approaches on Twitter data. Embodiments of the invention outperform the prior-art on multi-label information classification problems in large graphs. Therefore, embodiments of the invention provide a better, more efficient way for modeling social media messages through learning abundant diffusion data that has not be fully utilized. Embodiments of the invention are scalable and the optimization can be parallelized through open-source software libraries. Hence, the embodiments can be useful for a variety of social media mining problems where content based information is insufficient.

In the description that follows, Section 2 that defines the problem, Section 3 describes embodiments of the invention, Section 4 describes how the embodiments can be utilized to classify information diffusion sequences, Section 5 describes empirical evaluation of embodiments of the invention, Section 6 describes related embodiments, Section 7 describes a computing environment in which an embodiment of the invention may operate, and Section 8 provides a conclusion.

2. Problem Definition

Embodiments of the invention consider the problem of classifying social media messages propagated in a social media network, for example, into one or more categories. Embodiments define a graph of a social media network $G \in \langle V, E \rangle$, where $v_i \in V$ with $i \in [1, |V|]$ is a node (user) and $E \subseteq V \times V$ is the set of edges. If $e_{ij} \in E$, there is an edge between $v_i$ and $v_j$, otherwise there is not. Let M be the set of messages where $m_i \in M$ with $i \in [1, |M|]$. Each message $m_i$ has a corresponding set of spreaders $\{(v_1^{m_i}, t_1^{m_i}) (v_2^{m_i}, t_2^{m_i}), \ldots, (v_n^{m_i}, t_1^{m_i})\}$ where n is the number of spreaders for $m_i$ and $v_j^{m_i}$ is a user $v_j$ who spreads $m_i$ at the time of $t_j^{m_i}$. Messages are partially labeled and thus only some of them have an associated class label. Embodiments denote the set of labels as Y, where $y_i \in Y$ indicates that $m_i$ is labeled. The goal of embodiments of the invention is to learn a model with the social network graph G, the partially labeled messages in M, the corresponding diffusion traces, and the label information Y, to predict a classification, and corresponding label ŷ, for unlabeled messages in M.

Problem definition for prior art approaches: In order to make predictions for messages, most prior art methods take the problem as a text categorization task, hence, each message $m_i$ has a set of spreaders $\{(v_1^{m_i}, t_1^{m_i}, c_1^{m_i}), \ldots, (v_n^{m_i}, t_n^{m_i}, c_n^{m_i})\}$ where $c_j^{m_i}$ is the content information.

3. Embodiments of the Invention

The description that follows introduces how a diffusion trace can be used to facilitate classification of messages in a social media network. Embodiments first utilize sequential modeling methods to enable sequences to be used as attribute vectors. To alleviate the sparsity of sequences, a novel embedding method is used.

Figure 5:
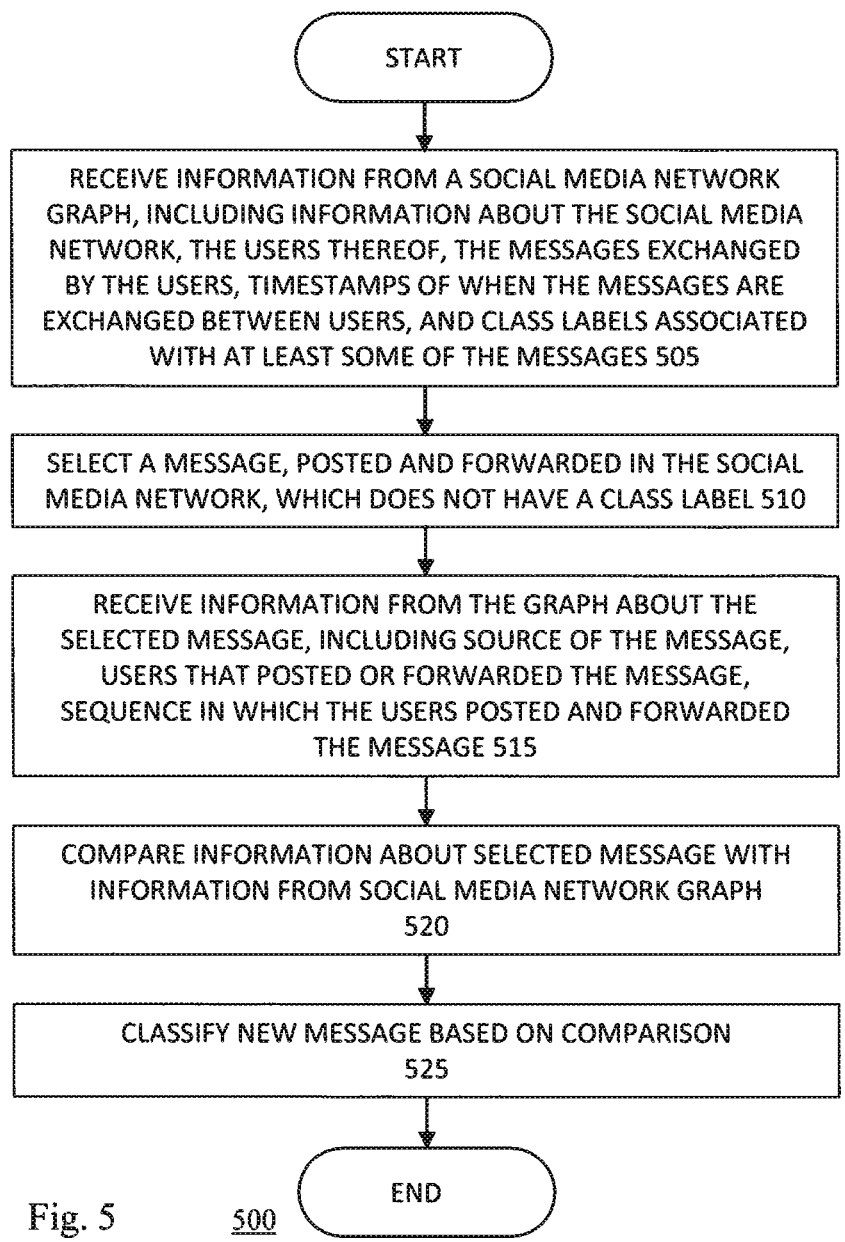
FIG. 5 is a flow diagram of program logic in accordance with an embodiment of the invention.

Generally speaking, with reference to FIG. 5, embodiments of the invention 500 include program logic to classify a social media message, given a social media network graph that includes information received by program logic 505 about a social media network, the users of the social media network, the social media messages that are exchanged between the plurality of users, the corresponding times at which the social media messages are exchanged between the users, and class labels associated with at least a subset of the social media messages. Program logic 510 selects a messaged posted and forwarded in the social media network for which the graph does not provide a class label. Program logic 515 then receives information about a social media message that does not have an associated class label, including a source of the social media message, which users posted or forwarded the social media message in the social media network, and the sequence in which the those users posted or forwarded the social media message in the social media network. Program logic 520 compares the information about the graph with the information about the unlabeled message, then program logic 525 classifies the social media message based on the received information about the social media message and the social media network graph.

3.1 Sequence Modeling

Given the spreader information $\{(v_1^{m_i}, t_1^{m_i}), \ldots, (v_n^{m_i}, t_n^{m_i})\}$ and the graph G of the social media network, the topology of information diffusion can be inferred by graph mining techniques, according to embodiments of the invention. The topology, which is usually a tree or forest (multiple trees) rooted with the initial spreader, contains informative patterns for characterizing a message. However, it is difficult to directly deal with the tree structure. Consider two messages with similar diffusion networks: adding or removing one spreader, or changing any direction of the information flow would lead to a different tree. Theoretically, there can be $n^{n-2}$ different trees with n number of different nodes according to the Cayley's formula.

In order to solve this problem, embodiments convert the tree structure into a temporal sequence. For example, given the spreaders of $m_i$ $\{(v_1^{m_i}, t_1^{m_i}), \ldots, (v_n^{m_i}, t_n^{m_i})\}$, embodiments generate a sequence $x_i = [(v_{q(1)}^{m_i}, t_{q(1)}^{m_i}), \ldots, (v_{q(n)}^{m_i}, t_{q(n)}^{m_i})]$ where for any two elements k and j in the sequence, if k<j, then $t_{q(k)}^{m_i} \leq t_{q(j)}^{m_i}$, meaning that $v_{q(k)}^{m_i}$ spread the information earlier than $v_{q(j)}^{m_i}$ did. Therefore, given n nodes, the number of all possible diffusion networks are reduced to n!. In order to further alleviate the sparsity, embodiments incorporate social proximity and social dimensions as described in Section 3.2.

However, a possible problem of temporally sequencing spreaders is the loss of dependencies between users. Given $v_i^m$ and $v_j^m$ where $e_{ij} \in E$, if $t_i^m < t_j^m$, it is likely that user i spreads the message to j or j is influenced by i. Such direct dependency is important in characterizing the information, i.e., the message. For example, the information flow from a controller account to botnet followers is a key signal in detecting crowdturfing. But if there is a spreader $(u_k^m, t_k^m)$, where $<t_i^m<t_j^m$, in the sequence, i and j will be separated. Therefore, it would be appealing if the model can take advantage of dependencies between separated and distant items in a sequence. To this end, one embodiment applies Recurrent Neural Networks (RNNs).

One embodiment uses an RNN to sequentially accept each spreader of a message and recurrently project it into a latent space with the contextual information from previous spreaders in the sequence. As the RNN reaches the end of the sequence, a prediction can be made based on the embedding vector produced by the hidden activations. In order to better encode the distant and separated dependencies, the embodiment further incorporates the Long Short-Term Memory cells into the RNN model, i.e., the LSTM-RNN.

In information diffusion, the first spreader who initiates the diffusion process is more likely to be useful for classifying the message. Hence, one embodiment feeds the spread sequence in the reverse order, where the first spreader in the sequence directly interacts with the prediction result, and thus has more impact. Each spreader is represented by a local RNN. Parameters W of RNNs are shared across each replication in the sequence and h' is the previous recurrent output sent between RNNs to exploit the contextual information. In order to make the prediction, the last local RNNs are taking the first spreader's attribute vector, prior recurrent output (and the label of the message) as input to predict the category of the message (or to train the RNNs model). Embodiments set the hidden node size (k) as 10. The way in which the attribute vector of nodes is obtained is described in Section 3.2.

Given LSTM-RNNs as one method to classify messages, a suitable way of learning attribute vectors f, for social media users, is needed. An intuitive way is to utilize the social network graph G to generate embedding vectors, and feed sequences of embedding vectors to the LSTM-RNNs. Embodiments of the invention use such embedding-based preprocessing for sequential data since 1) several social graph embedding approaches have proven useful for classification tasks, such as Large Scale Information Network (LINE) embedding and DeepWalk social graph embedding, and 2) users that appear in spread traces follow a similar distribution of how words appear in the social media posts.

Figure 6:
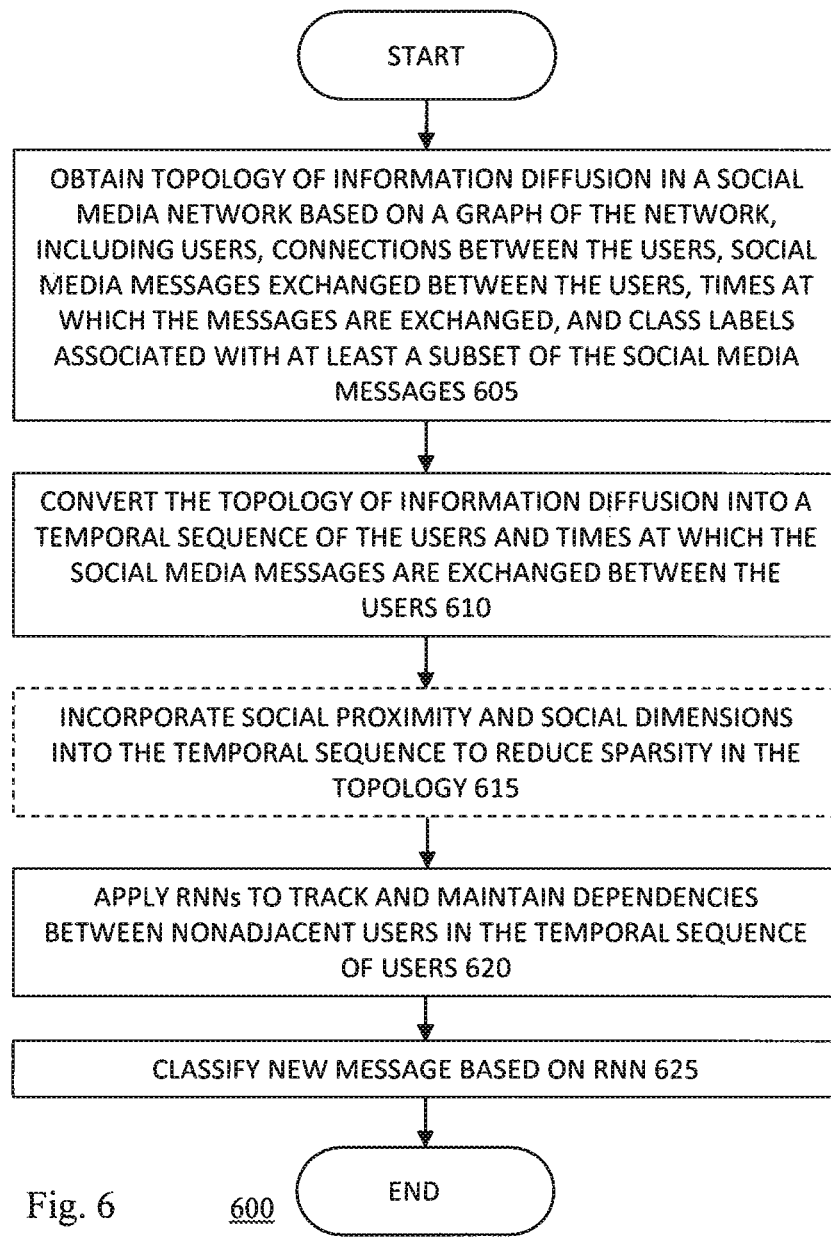
FIG. 6 is a flow diagram of program logic in accordance with an embodiment of the invention.

Thus, with reference to FIG. 6, embodiments of the invention 600 include program logic for classifying a social media message received in a social media network. The logic at 605 obtains topology of information diffusion in the social media network based on a graph of the social media network, for example, using graph mining techniques. The graph identifies users and connections between the users, social media messages that are exchanged between two or more of the users, times at which the social media messages are exchanged between the two or more users, and class labels associated with at least a subset of the social media messages. The program logic 610 further converts the topology of information diffusion into a temporal sequence of the users and the times at which the social media messages are exchanged between the two or more users. Next, program logic 620 applies Recurrent Neural Networks (RNNs) to track and maintain dependencies between nonadjacent users in the temporal sequence of the users. Program logic 625 then can receive a social media message in the social media network and classify it based on the RNNs.

According to embodiments, the program logic for converting the topology of information diffusion into a temporal sequence of the users and the times at which the social media messages are exchanged between the users reduces the topology of diffusion information. In one embodiment, program logic 615 incorporates social proximity and social dimensions in to the temporal sequence of the users alleviates sparsity in the topology of information diffusion.

Figure 1A:
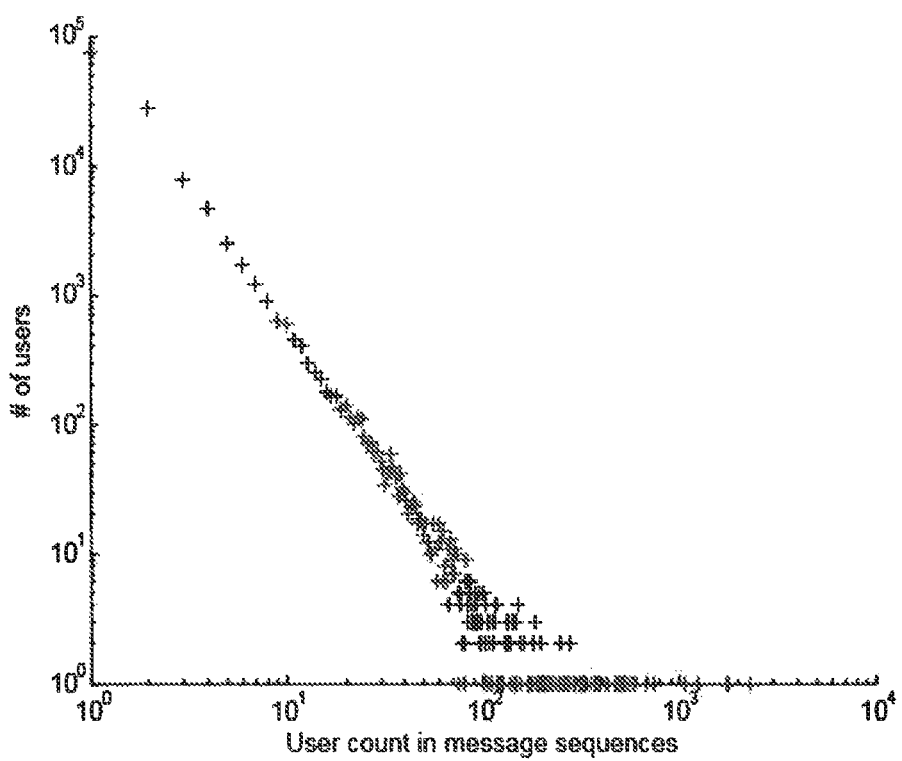
FIG. 1A illustrates the frequency of users appearing in traces of social media messages follows a power-law distribution, which is similar to the distribution of word frequencies in messages.
Figure 1B:
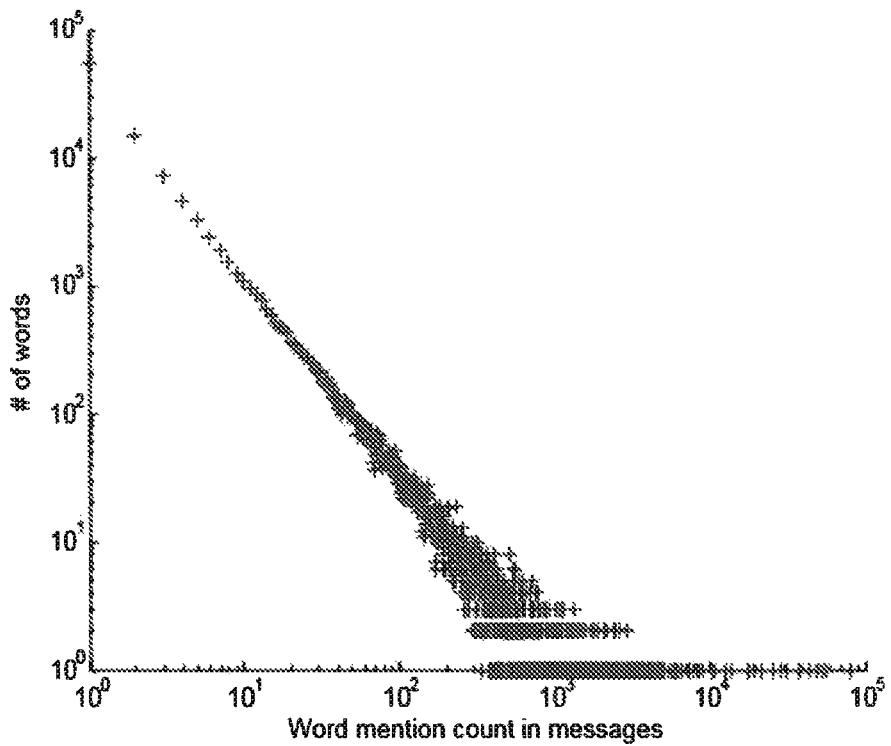
FIG. 1B illustrates the distribution of words in social media message traces.

FIG. 1A illustrates the distribution of users in social media message traces. FIG. 1B illustrates the distribution of words in social media message traces. The distribution in FIG. 1A comes from a real-world Twitter message trace dataset showing how users appear in message traces. The distribution in FIG. 1B comes from the same dataset showing how words appear in message content. They both follow a power-law distribution, which motivates embedding users into low dimensional vectors, in the same manner as how embedding vectors of words are used in natural language processing. Several graph embedding algorithms are available. The following subsection compares their performance and provides a selected embodiment and reasons behind the choice Embodiments contemplate training of the LSTM-RNNs as in Algorithm 1, set forth below. The labeled spreader sequences X and the corresponding labels Y, are input, which are randomly split into a training and a validation set in line 2. In addition to the maximum number of iterations $Max_{iter}$, a function EarlyStop( ) is used for controlling early termination of the training, which takes the loss on the validation set as the input. In line 1, embodiments initialize the model parameters randomly with Gaussian distribution. From line 3 to 7, embodiments update W with training data until the maximum epoch is reached or the early termination condition is met. The loss function used in line 4 is shown below:

$$\sum_{i=1}^{|X_{tr}|} |Y_{tr} = 0|y_i\log(\hat{y}_i) + |Y_{tr} = 1|(1 - y_i)(\log(1 - \hat{y}_i)). \quad (1)$$

where $y_i$ is the true label of i and $\hat{y}_i$ is the corresponding prediction. So Eq. (1) calculates the cross entropy between the true labels and the prediction. ($|Y_{tr}=0|(|Y_{tr}=1|)$ is the number of negative (positive) instances in the training set. Since embodiments work on multi-label classification, the data is naturally imbalanced when one of them is modeled. Introducing the weight helps the model balance the gradient of skewed data. The next subsection describes how to generate embeddings and the reason behind doing so.

---
Algorithm 1 Training Algorithm of LSTM-RNNs
---
Input: Labeled sequences and labels    X, Y
    Maximum number of iterations:    $Max_{iter}$
    Early termination function:    EarlyStop( )
Output: weights of LSTM-RNNs:    W
    1: Initialize W Randomly with Gaussian distribution,
       V Loss[$Max_{iter}$], i = 0
    2: Split X and Y into training and validation set ($X_{tr}$, $Y_{tr}$) and
       ($X_{val}$,$Y_{val}$)
    3: do
    4:    Train RNNs with ($X_{tr}$, $Y_{tr}$) for 1 epoch with Eq.(1)
    5:    Test RNNs with ($X_{val}$, $Y_{val}$) to obtain loss V Loss[t]
    6:    i = i + 1
    7: while EarlyStop(V Loss, i) = FALSE AND (i < $Max_{iter}$)

3.2 Embedding Users

Given the framework of sequence modeling, it is important to select the proper embedding method that captures the intrinsic features of social media users. As described previously, using embedding vectors can help alleviate the data sparsity through leveraging social proximity and social dimensions. Embodiments mainly focus on two embedding approaches that have proven effective on social graphs, LINE and DeepWalk. Both LINE and DeepWalk aim to provide a representation for data instances that captures the inherent properties, such as social proximity.

These methods mainly focus on the microscopic structure of networks. For example, first-order proximity constrains users that are connected to be similar and second-order proximity constrains users that have common friends to be similar. LINE achieves this by sampling such nodes from the network and updating their representations jointly, while DeepWalk samples a sequence of data with a random walk algorithm. Nevertheless, for a large social graph, some mesoscopic structure such as social dimensions and community structures are more useful in characterizing information. Therefore, the embedding method should be able to capture both local proximity and community structures, according to embodiments of the invention.

Table 1, below, illustrates the results of using different embedding methods. LINE, DeepWalk and SocDim are tested on Twitter data and show the distance between neighbors with the new representation. Community structures are detected in the network and the average of distances between nodes that are in the same community is calculated. The community detection algorithm is an accelerated version of the Louvain method. As shown in the table, LINE captures the first and second-degree proximity, while SocDim best captures the community-wise proximity. Based on the random walk, DeepWalk achieves better community-wise proximity, however, it is still outperformed by SocDim, which directly models the community structure.

TABLE 1

Average Euclidean distance between nodes with low dimensional representation.

| Method | $1^{st}$-degree | $2^{nd}$-degree | Intra-goup |
|---|---|---|---|
| LINE | 5.16 | 5.00 | 10.76 |
| DeepWalk | 7.74 | 7.69 | 6.04 |
| SocDim | 6.87 | 6.12 | 4.55 |

In order to capture both the social proximity and community-wise similarity among users, embodiments of the invention use a principled framework that directly models both kinds of information. Given the social graph G, embodiments can derive an adjacency matrix $S \in \mathbb{R}^{n \times n}$, where n is the number of users. One goal is to learn a transformation matrix $M \in \mathbb{R}^{n \times k}$ which converts users to a latent space with the dimensionality of k. Note that embodiments reuse k for brevity of presentation, and the number of features and hidden nodes in the LSTM-RNNs are not necessarily the same. In order to capture the community-wise similarity, embodiments introduce two auxiliary matrices, a community indicator matrix $H \in \mathbb{R}^{n \times g}$, where g is the number of communities and $tr(HH^T)=n$ (only one element is 1 in each row and all the others are 0), and a community representation matrix $C \in \mathbb{R}^{g \times k}$, where each row $c_i$ is an embedding vector describing the community. In order to capture the community structure, embodiments embed the problem into an attributed community detection model:

$$\min_{M,H,C} \sum_{i=1}^{n} \|s_i M - h_i C\|_2^2 + \alpha \|H - MC^T\|_F^2, \quad (2)$$

s.t. $tr(HH^T) = n$, where $s_iM$ is the embedding vector and embodiments regularize it to be similar to the representation of its corresponding community $h_iC$. The second term aims to achieve the intra-group coherence by predicting the community assignment by group the embedding vectors of users and communities. The objective function in Eq. (2) aims to cluster nodes with embedding vectors. In order to further regularize the clusters to be social communities, embodiments adopt a modularity maximization-based method, which has been used to detect communities with network information. Specifically, given the adjacency matrix S and the community membership indicator, the modularity is defined as follows:

$$Q = \frac{1}{2|E|} \sum_{i,j} \left( S_{ij} - \frac{d_i d_j}{2|E|} \right) (h_i h_j^T), \quad (3)$$

where $|E|$ is the number of edges and $d_i$ is the degree of i. $d_i$ is the community assignment vector for i, and $h_i h_j^T = 1$ if i and j belong to the same community, otherwise $$h_i h_j^T = 0 \cdot \frac{d_i d_j}{2|E|}$$

is the expected number of edges between i and j if edges are placed at random. Modularity Q measures the difference between the number of actual edges within a community and the expected number of edges placed at random. An optimal community structure H should maximize the modularity Q. By defining the modularity matrix $B \in \mathbb{R}^{n \times n}$ where $$B_{ij} = S_{ij} - \frac{d_i d_j}{2|E|} |$$

and suppressing the constant which has no effect on the modularity, Eq. (3) can be rewritten as follows:

$Q = tr(H^T B H)$.

In order to guarantee that the embedding vectors preserve the community structure in the latent space, embodiments integrate modularity maximization into the embedding method.

The objective function can be rewritten with the modularity maximization regularizer as follows:

$$\min_{M,H,C} \sum_{i=1}^{n} \|s_i M - h_i C\|_2^2 + \alpha \|H - MC^T\|_F^2 - \beta tr(H^T B H) \quad (4)$$

s.t. $tr(HH^T) = n$, where $\beta$ controls the influence of community structures. As described previously, the microscopic structure is also important for generating embedding vectors. In order to jointly consider both mesoscopic and microscopic structures, embodiments decompose M into a conjunction of a global model parameter $\tilde{M}$ and a localized variable $M_i$ for each user i ($M = \tilde{M} + M_i$ for each user i). Therefore, M captures the community structure and $M_i$ can be used to directly apprehend the microscopic structure between nodes. Embodiments fortify the representation of nodes with proximity by the network lasso regularization term:

$$\sum_{i,j} A_{ij} \|M_i - M_j\|_F^2.$$

where $A \in \mathbb{R}^{n \times n}$ is the microscopic structure matrix, $A_{ij}=1$ if embodiments aim to preserve the proximity between i and j in the latent space. Following graph embedding practices embodiments consider first- and second-degree proximity, meaning that $A_{ij}=1$ if i and j are connected or share a common friend. Note that A can be specified with particular applications. Imposing the Frobenius norm of the difference between Mi and Mj incentivizes them to be the same when Aij=1. By incorporating the network lasso regularizer, the objective function can be reformulated as follows:

$$\min_{M,H,C} \sum_{i=1}^{n} \|s_i(\tilde{M} + M_i) - h_i C\|_2^2 + \quad (5)$$

$$\alpha \|H - \tilde{M} C^T\|_F^2 - \beta tr(H^T B H) + \gamma \sum_{i,j} A_{ij} \|M_i - M_j\|_F^2,$$

s.t. $tr(HH^T) = n$, where $\gamma$ controls the influence of the network lasso. As can be seen, embodiments establish the consensus relationship between mesoscopic and microscopic network structures by jointly considering the social communities and proximity. By introducing the global parameter $\tilde{M}$ and the personal variable Mi, embodiments force both kinds of information to be preserved in the newly-learnt embedding vectors. However, Eq. (5) is not jointly convex to all the parameters M, H and C. Thus, embodiments separate the optimization into four sub-problems and iteratively optimize them. The following description introduces details of the optimization.

Update $\tilde{M}$ while fixing $M_i$, H and C: By removing terms that are irrelevant to $\tilde{M}$, embodiments obtain the following optimization problem:

$$\min_{\tilde{M}} \sum_{i=1}^{n} \|s_i \tilde{M} + s_i M_i - h_i C\|_2^2 + \alpha \|H - \tilde{M} C^T\|_F^2, \quad (6)$$

which is convex w.r.t. $\tilde{M}$. In real applications, the number of users n may be huge. Hence, embodiments adopt a gradient-based update rule as follows:

$$\tilde{M} = \tilde{M} - \tau \frac{\partial \epsilon_{\tilde{M}}}{\partial \tilde{M}}, \quad (7)$$

where $\tau$ is the step size that can be obtained through backtracking line search. The derivative of $\tilde{M}$ is shown as follows:

$$\frac{\partial \epsilon_{\tilde{M}}}{\partial \tilde{M}} = s_i^T \sum_{i=1}^{n} (s_i \tilde{M} + s_i M_i - h_i C) + \alpha(H - \tilde{M} C^T) C. \quad (8)$$

Update $M_i$ while fixing $\tilde{M}$, H and C: By removing terms that are irrelevant to Mi, embodiments obtain the following optimization problem:

$$\min_{M_i} \sum_{i=1}^{n} \|s_i\tilde{M} + s_iM_i - h_iC\|_2^2 + \gamma\sum_{i,j} A_{ij}\|M_i - M_j\|_F^2 \quad (9)$$

which is convex w.r.t. $M_i$. Similarly, embodiments derive the gradient:

$$\frac{\partial \epsilon_{M_i}}{\partial M_i} = s_i^T \sum_{i=1}^{n}(s_i\tilde{M} + s_iM_i - h_iC) + \gamma\sum_{i,j} A_{ij}(M_i - M_j). \quad (10)$$

Update C while fixing $\tilde{M}$, $m_i$, and H: By removing terms that are irrelevant to C, embodiments obtain the following optimization problem:

$$\min_{C} \sum_{i=1}^{n} \|s_i(\tilde{M} + M_i) - h_iC\|_2^2 + \alpha\|H - \tilde{M}C^T\|_F^2, \quad (11)$$

which is convex w.r.t. C. Similarly, the gradient can be obtained as:

$$\frac{\partial \epsilon_C}{\partial C} = \sum_{i=1}^{n} h_j^T(h_iC - s_i\tilde{M} - s_iM_i) + \alpha(\tilde{M}C^T - H)^T\tilde{M}. \quad (12)$$

Update H while fixing M, $M_i$, and C: By removing terms that are irrelevant to H, embodiments obtain the following optimization problem:

$$\min_{H} \|SM - HC\|_F^2 + \alpha\|H - \tilde{M}C^T\|_F^2 - \beta tr(H^T(S - \hat{B})H), \quad (13)$$
$$\text{s.t. } tr(HH^T) = n,$$

where $$\hat{B}_{ij} = \frac{d_id_j}{2|E|}.$$

Consider that H is an indicator matrix, the constraint makes the problem in Eq. (13) NP-complete, which is difficult to solve. Thus, embodiments relax the constraint to orthogonality $H^TH=I$ and nonnegativity $H\geq 0$ and reformulate the objective function as follows:

$$\epsilon_H = -\beta tr(H^TSH) + \beta tr(H^T\check{B}H) + \|SM - HC\|_F^2 + \alpha\|H - \hat{M}C^T\|_F^2 + \lambda\|H^TH - I\|_F^2, \quad (14)$$

where $\lambda > 0$ should be a large number to guarantee the orthogonal constraint to be satisfied, and embodiments set it as $10^8$. Embodiments then utilize the property that $\|X\|_F^2 = tr(X^TX)$ to reformulate the loss function as follows:

$$\epsilon_H = -\beta tr(H^TSH) + \beta tr(H^T\hat{B}H) + \quad (15)$$
$$tr(SMM^TS^T + HCC^TH^T - 2SMC^TH^T) +$$
$$\alpha tr(HH^T + \hat{M}C^TC\tilde{M}^T - 2HC\tilde{M}^T) +$$
$$\lambda tr(H^THH^TH - 2H^TH + I) + tr(\Theta H^T),$$

where $\Theta = [\Theta_{ij}]$ is a Lagrange multiplier matrix to impose the nonnegative constraint. Set the derivative of $$\frac{\partial \epsilon H}{\partial H}$$

to 0, embodiments have:

$$\Theta = 2SH - 2\beta\tilde{B}H - 2CC^TH^T + \quad (16)$$
$$2SMC^T - 2\alpha H^T + 2\alpha C\tilde{M}^T - 4\lambda HH^TH + 4\lambda H.$$

Following the Karush-Kuhn-Tucker (KKT) condition for the nonnegativity, embodiments have the equation as follows:

$$(2SH-2\beta\tilde{B}H-2CC^TH^T+2SMC^T-2\alpha H^T+2\alpha C\tilde{M}^T- \quad (17)$$
$$4\lambda HH^TH+4\lambda H)_{ij}H_{ij}=0_{ij}H_{ij}=0,$$

which is the fixed point equation that the solution must satisfy at convergence. The update rule for H can be written as follows:

$$H = H \odot \sqrt{\frac{-2\beta\tilde{B}H + \sqrt{\Delta}}{8\lambda HH^TH}}, \quad (18)$$

where $\Delta$ is defined as:

$$\Delta = 2\beta(\tilde{B}H) \odot (\tilde{B}H) + 16\lambda(HH^TH) \odot \quad (19)$$
$$(2SH - 2CC^TH + 2SMC^T - 2\alpha H^T + 2\alpha C\tilde{M}^T + 4\lambda H).$$

The convergence of Eq. (19) can be proven as an instance of nonnegative matrix factorization (NMF) problem.

3.3 Time Complexity

Embodiments of the invention may comprise two components, LSTM-RNNs, and the embedding method. Though LSTM-RNNs take O(|E|+|V|)-time for backpropagations, the scalability can be easily increased with deep learning software library like Theano, a Python library and optimizing compiler for manipulating and evaluating mathematical expressions, especially matrix-valued ones, and especially when a Graphics Processing Unit (GPU) is available.

Since the number of users is usually far larger than the number of features and number of communities, the embedding method takes $O(n^2)$-time. Only matrix multiplication is used in all update rules, so the optimization can be accelerated by utilizing matrix optimization library like Open-BLAS—an open source implementation of the Basic Linear Algebra Subprograms (BLAS) API with optimizations for specific processor types, developed at the Lab of Parallel Software and Computational Science, ISCAS.

4. Algorithm According to Embodiments of the Invention

A detailed procedure for network diffusion classification is now described in accordance with embodiments of the invention. The overall process comprises two steps:

Step 1: Learning embeddings based on network connectivity. Embodiments aim to utilize the social identity of a user to infer the information she spreads. Hence, embodiments learn embeddings from friendships and social community memberships.

Step 2: Construct a sequence classifier with LSTM-RNNs. After embodiments obtain the embeddings of social media users, embodiments consider a social media message as a sequence of its spreaders. Embodiments employ LSTM-RNNs to model the sequence, and the final hidden output are aggregated using softmax to produce a predicted class label.

The above mentioned first step utilizes network structures to embed social media users into space of low dimensionality, which alleviates the data sparsity of utilizing social media users as features. The above mentioned second step represents user sequences of information diffusion, which allows for the classification of propagation pathways.

Figure 3C:
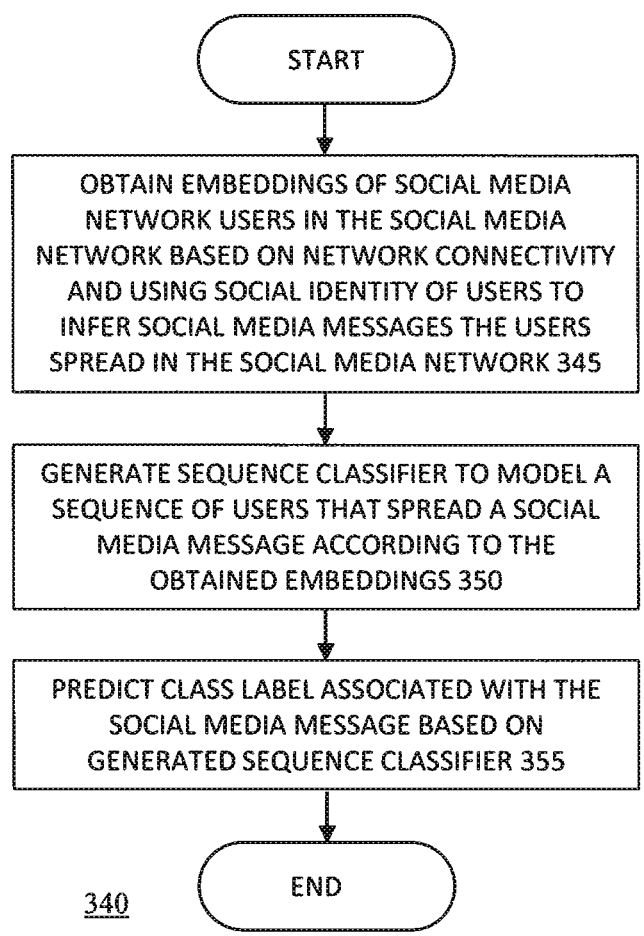
FIG. 3C is a flow diagram of program logic in accordance with an embodiment of the invention.

Thus, with reference to FIG. 3C, according to embodiments of the invention 340, network diffusion classification in a social media network comprises program logic 345 for obtaining embeddings of users of the social media network based on network connectivity, wherein the program logic for obtaining embeddings of users utilize a social identity of a user of the social media network to infer social media messages the user spreads in the social media network. Program logic 350 then constructs a sequence classifier with LSTM-RNNs to model a sequence of users that spread a social media message according to the obtained embeddings of users of the social media network. Finally, program logic 355 predicts a class label associated with the social media message based on the sequence classifier. According to these embodiments, the program logic for obtaining embeddings of users of the social media network based on network connectivity may involve program logic for obtaining embeddings of users of the social media network based on at least one of friendships and social community memberships in the social media network.

TABLE 2

Statistics of the datasets used in this study.

| | Messages | Posts | Unique Users | Class Ratio |
|---|---|---|---|---|
| Real News | 68,892 | 288,591 | 121,211 | 0.27(b):0.25(t):0.37(e):0.11(m) |
| Fake News | 3,600 | 17,613 | 9,153 | 0.5:0.5 |

5. Experiment

In this section, experiment details are provided to validate the effectiveness of the embodiments of the invention. Through the experiments, two questions are answered:

How well can network information be used to classify social messages compared with content information?

How effective are the LSTM-RNNs by integrating with the embedding method?

Therefore, the methods are tested on two different classification tasks with real-world datasets and include both content-based and network-based baselines for comparison.

5.1 Datasets

Over 200 million posts are posted per day on Twitter and the popularity has made Twitter a testbed for information filtering research. The experiment aims to collect a large dataset that includes tweets about specific messages. Experiments leverage the Twitter Search API to retrieve tweets of interests by compiling queries with certain topics.

Experiments deal with two tasks: standard news classification, and fake news detection. News classification is a classical multi-label text categorization problem and prior-art efforts have mainly focused on the content. Experiments obtain a news dataset which was originally used for content-based classification by selecting news that has at least two posts on Twitter. Queries for Twitter Search API are compiled by words in the title of the corresponding news. Based on the spreaders of news, experiments attempt to classify the news into four categories: business (b), science and technology (t), entertainment (e), medical (m). Statistics about the dataset are shown in Table 2. Experiments sample 68,892 pieces of news, which relate to 288,591 posts with 121,211 unique users. The ratio of different categories is also presented.

The other task is fake news detection. The openness of social media platforms enables timely information to be spread at a high rate. Meanwhile, it also allows for the rapid creation and dissemination of fake news. Experiments retrieve tweets related to fake news by compiling queries with a fact-checking website. Experiments choose Snopes to obtain ground truth, where articles tagged with fake news were collected. In order to obtain non-fake news posts pertaining to the same topic, experiments extract keywords in regular expressions as queries to retrieve posts. Statistics of the dataset is shown in Table 2. Experiments collect 3,600 messages with 50% being fake news.

5.2 Experiment Settings

A core contribution of embodiments of the invention is the idea that spreaders of information can be used to predict message categories. Therefore, the effectiveness of the embodiments is compared with the prior-art content-based approaches. Embodiments may use a variety of approaches, and the following two appear to achieve better results.

SVM trains on content information, which is first preprocessed with the Stanford CoreNLP toolkit. Embodiments adopt bigram and trigram features based on results on the validation set.

XGBoost is an optimized distributed gradient boosting library that implements machine learning algorithms under the Gradient Boosting framework. It has been successfully applied to various problems and competitions. Embodiments feed it with the preprocessed content produced by Stanford CoreNLP. XGBoost presents the best results among all content-based algorithms tested.

Embodiments of the invention use a novel embedding method. In order to evaluate their effectiveness, two variants of the embodiments are introduced and their results presented for comparison:

TM(DeepWalk) is a variant of embodiments of the invention by adopting the embedding vectors from DeepWalk as input. As described earlier, DeepWalk captures proximity between nodes with random walk: nodes that are sampled together with one random walk are forced to preserve the similarity in the latent space. Therefore, DeepWalk does not directly model the first and second-degree proximity or the community structure.

TM(LINE) is a variant of embodiments of the invention by adopting the embedding vectors from LINE. LINE models first and second-degree proximity while does not consider the community structure between users.

To test the prediction accuracy in terms of both precision and recall, experiments adopted the $F_1$-measure to evaluate the performance. Since there are multiple labels to be predicted, for each task t, $F_1^t$ can be computed. In order to get the overall performance, experiments first adopt the Macro-averaged $F_1$-measure as:

$$\text{Macro} - F_1 = \frac{1}{|T|} \sum_{t \in T} F_1^t, \quad (20)$$

where T is the set of all identity labels and $F_1^t$ is the $F_1$-measure of task t.

A possible problem of Macro-$F_1$ is that since the sizes of different categories are different, the task with fewer instances may be overemphasized. In order to cope with this problem, experiments adopted Micro-averaged $F_1$-measure. First, experiments calculate the micro averaged precision and recall:

$$\text{Micro-precision} = \frac{\#TP}{\#TP + \#FP} \quad (21)$$

$$\text{Micro-recall} = \frac{\#TP}{\#TP + \#FN},$$

where #TP is the number of true positives, #FP is the number of false positives and #FN is the number of false negatives. Micro-$F_1$ is the harmonic average of Micro-precision and Micro-recall.

5.3 Experimental Results

Social Media News Categorization: The performance of different methods on Twitter News data with varying training ratio, from 10% to 90%, is illustrated in Table 3, above. For each experiment, samples are randomly split into training and testing set. This process is repeated 10 times and the average results reported. The highest performance under each setting is highlighted in boldface type font.

In terms of Micro-$F_1$, the experiment outperforms all the baselines and its variations, TM(DeepWalk), TM(LINE). Diffusion-based methods according to embodiments of the invention perform better than content based methods. XGBoost performs slightly better than SVM. TM(Deep-Walk) is the runner-up method for 10%, 20% and 50%, and TM(LINE) is the runner-up for the rest of the cases. The result shows that when less network data is available, the random walk-based approach produces better embeddings of users; and a more deterministic method constraining on social proximity better apprehends user behaviors when the network information is more complete. Embodiments achieve the best result for all tasks. By jointly modeling the microscopic and mesoscopic structures, such an embodiment is more robust to data sparsity.

In terms of Macro-$F_1$, XGBoost outperforms SVM for all cases. Similar pattern has again been observed: TM(Deep-Walk) outperforms TM(LINE) with less training information, while TM(LINE) outperforms TM(DeepWalk) when the information is more complete. Embodiments still perform the best among most cases until the training ratio is increased up to 80%. XGBoost and TM(LINE) achieves the best result for 80% and 90%, respectively. Two observations can be made here: with more training information becoming available, 1) the margin between the embodiments and the content based methods becomes smaller; and 2) the margin between one embodiment and its variants TM(LINE) and TM(DeepWalk) becomes smaller. Based on the observations, the embodiments of the invention are more useful when less training information is available, and the embodiments can well handle scarce data in the early phase of learning when less training information is known. XGBoost gets the best performance when 80% of information is available. Since text-based categorization is a well-studied problem, and it is easy to solve when rich information is available, the embodiments will be able to complement those cases that are difficult for content-based approaches to deal with, and such cases are pervasively present in social media mining tasks where content information is insufficient and noisy.

Another observation that again validates the findings is that embodiments perform better in terms of Micro-$F_1$. As shown in Eq. (20) and (21), in a multi-label classification task, the category with fewer instances is more advantageous for Macro-$F_1$. The results show that embodiments actually end up with correctly classifying more instances.

Fake News Detection: The performance of different methods on Twitter fake news data with varying training ratio, from 10% to 90%, is illustrated in Table 4. Since the dataset is balanced, Micro- and Macro-$F_1$ are the same, so only one set of results are presented. For the content-based approaches, XGBoost consistently outperforms SVM for all cases. For the two variants of embodiments of the invention, similar patterns are observed: TM(DeepWalk) outperforms TM(LINE) when less training information is available. TM(LINE) outperforms TM(DeepWalk) when more information is available for training. It again proves that random walk-based sampling is more effective for scarce data, and proximity-based regularization better captures data structures with more training information.

TABLE 3

The $F_1$ - measure of different methods on the task of social media news categorization.

|   | Training Ratio | 10% | 20% | 30% | 40% | 50% | 60% | 70% | 80% | 90% |
|---|---|---|---|---|---|---|---|---|---|---|
| Micro-$F_1$(%) | SVM | 0.6967 | 0.7138 | 0.7447 | 0.7577 | 0.7988 | 0.8096 | 0.8499 | 0.8787 | 0.8996 |
|  | XGBoost | 0.7121 | 0.7349 | 0.7512 | 0.7794 | 0.8248 | 0.8250 | 0.8638 | 0.8951 | 0.9047 |
|  | TM(DeepWalk) | 0.7895 | 0.8081 | 0.8149 | 0.8374 | 0.8569 | 0.8627 | 0.8852 | 0.8917 | 0.9184 |
|  | TM(LINE) | 0.7691 | 0.7926 | 0.8163 | 0.8379 | 0.8467 | 0.8744 | 0.8980 | 0.9106 | 0.9253 |
|  | TraceMiner | 0.8275 | 0.8460 | 0.8658 | 0.8835 | 0.8885 | 0.9141 | 0.9218 | 0.9357 | 0.9380 |
| Macro-$F_1$(%) | SVM | 0.6988 | 0.7260 | 0.7425 | 0.7754 | 0.7665 | 0.7872 | 0.8188 | 0.8314 | 0.8722 |
|  | XGBoost | 0.7305 | 0.7438 | 0.7857 | 0.7887 | 0.8144 | 0.8344 | 0.8726 | 0.8941 | 0.9044 |
|  | TM(DeepWalk) | 0.7746 | 0.8010 | 0.8156 | 0.8313 | 0.8377 | 0.8611 | 0.8646 | 0.8734 | 0.8839 |
|  | TM(LINE) | 0.7561 | 0.7895 | 0.8019 | 0.8138 | 0.8235 | 0.8568 | 0.8775 | 0.8896 | 0.9153 |
|  | TraceMiner | 0.8181 | 0.8347 | 0.8359 | 0.8349 | 0.8635 | 0.8788 | 0.8779 | 0.8882 | 0.9064 |

An interesting difference between the results for fake news and the previous experiment is the larger margin between the methods according to embodiments of the invention and content-based methods. Unlike posts related to news where the content information is more self-explanatory, content of posts about fake news is less descriptive. Intentional spreaders of fake news may manipulate the content to make it look more similar to non-rumor information. Hence, embodiments can be useful for many emerging tasks in social media where adversarial attacks are present, such as detecting rumors and crowdturfing. The margin between content-based approaches and embodiments of the invention become smaller when more information is available for training, however, in these emerging tasks, training information is usually time-consuming and labor-intensive to obtain.

ing. These prior-art methods focus on the nodes in the graph, while embodiments of the invention focus on the network structure itself, which is manifested by the diffusion of messages. In addition, unlike prior-art graph representation methods, a goal of embodiments of the invention is to provide an end-to-end system with prediction results, instead of offering only the embedding vectors. Recent research has proposed using RNNs for classification in a semi-supervised manner, which is also related to the embodiments. Thus, embodiments of the invention provide a technical solution to a technical problem.

Embodiments present a novel graph embedding model, which is related to prior-art embedding methods and feature selection on networked data. For example, DeepWalk links a network embedding problem into a word embedding problem by showing the similar distribution of nodes

| Training Ratio | 10% | 20% | 30% | 40% | 50% | 60% | 70% | 80% | 90% |
|---|---|---|---|---|---|---|---|---|---|
| SVM | 0.5825 | 0.5779 | 0.6122 | 0.6194 | 0.6658 | 0.7114 | 0.7224 | 0.7252 | 0.7581 |
| XGBoost | 0.6558 | 0.7004 | 0.7002 | 0.7153 | 0.7288 | 0.7703 | 0.7984 | 0.8115 | 0.8226 |
| TM(DeepWalk) | 0.7804 | 0.7810 | 0.8078 | 0.8264 | 0.8194 | 0.8491 | 0.8542 | 0.8738 | 0.8894 |
| TM(LINE) | 0.7542 | 0.7547 | 0.7913 | 0.8015 | 0.8083 | 0.8485 | 0.8733 | 0.8936 | 0.8971 |
| TraceMiner | 0.7867 | 0.7935 | 0.8344 | 0.8459 | 0.8547 | 0.8751 | 0.8988 | 0.9089 | 0.9124 |

Another point to consider is the performance when the training information is very insufficient. When 10% of information is available, SVM has an $F_1$ score of 58% which is slightly better than a random guess, while one embodiment of the invention has an $F_1$ score of 78%. Although such margin is reduced when more information is available, the optimal performance with very few training information is significant for tasks which emphasize on the earliness. For example, detecting fake news at an early stage is way more meaningful than detecting it when 90% percent of its information is known. In conclusion, embodiments of the invention provide an effective method for modeling messages diffused in social media with only network information, which provides a complementary tool for emerging tasks that require earliness and/or suffers from the scarcity of content information.

6. Related Embodiments

The above described embodiments mainly focus on classifying social media messages, which is a fundamental problem in social media mining. Such can be useful for many classical tasks including social recommendation, personalization and targeted advertising. Accurate categorization of social media content allows for precise filtering of information, which helps alleviate information overloading. There has been a recent surge in social media platforms of attacks of disinformation launched by malicious users. Both content and network information has been studied to detect malicious users, such as spammers and crowdturfers. In terms of network information, prior-art approaches usually derive features from the social networks and spreaders of a message. For example, one approach assumes that the information spread by similar users tend to share similar properties, and the network information mainly centers around the user instead of information itself. Embodiments of the invention differ from the prior art by directly studying the network information.

The embodiments are also related to network structure mining methods. Neural network models have been applied on network data for tasks such as classification and cluster-appearing in random walks and words appearing in sentences. Embodiments of the invention employ a Skip-Gram model, which was originally proposed for modeling natural languages, to learn embedding of graphs. LINE aims to preserve the first- and second-order proximity between nodes, and provides an embedding vector by concatenating results on both levels. Embodiments focus on encoding both social proximity and social community information to alleviate the data sparsity, instead of investigating only one of them. Recent studies also study and utilize network dynamics by observing the change of social networks over time. Embodiments focus on a snapshot since the newly established/withdrawn links during the study are very few.

Embodiments of the invention are related to information diffusion. There are various models which are designed to abstract the pattern of information diffusion, such as the SIR Model, the Tipping Model, the Independent Cascade Model, and the Linear Threshold Model. However, prior-art information diffusion models abstract the diffusion process to estimate the virality of information and ignore the interaction between multiple campaigns, which cannot be directly applied here.

Embodiments are particularly helpful in identifying messages that cannot be easily detected with, or based on, the content, such as in rumor and fake news detection. For example, supervised learning approaches have been used to detect rumors and the spreaders. Such approaches usually consist of two stages: employing a feature engineering approach to distinguish misinformation from Twitter's normal content stream and utilizing a supervised learning approach to train a detector. However, these supervised approaches depend on content information, which can be easily manipulated by malicious spreaders. Previous studies have explored how malicious information can be detected from node to node, however, the proposed approaches can only help visualize and track known events and require experts to observe it and make decisions. The approaches require certain domain knowledge and expertise. In contrast, embodiments of the invention are an end-to-end method that directly studies the information diffusion. Because previous approaches depend on content information, they require more CPU, memory and storage, and take longer to process. In contrast, since embodiments of the invention are based on information diffusion, the embodiments improve the efficiency of the computer.

Figure 2:
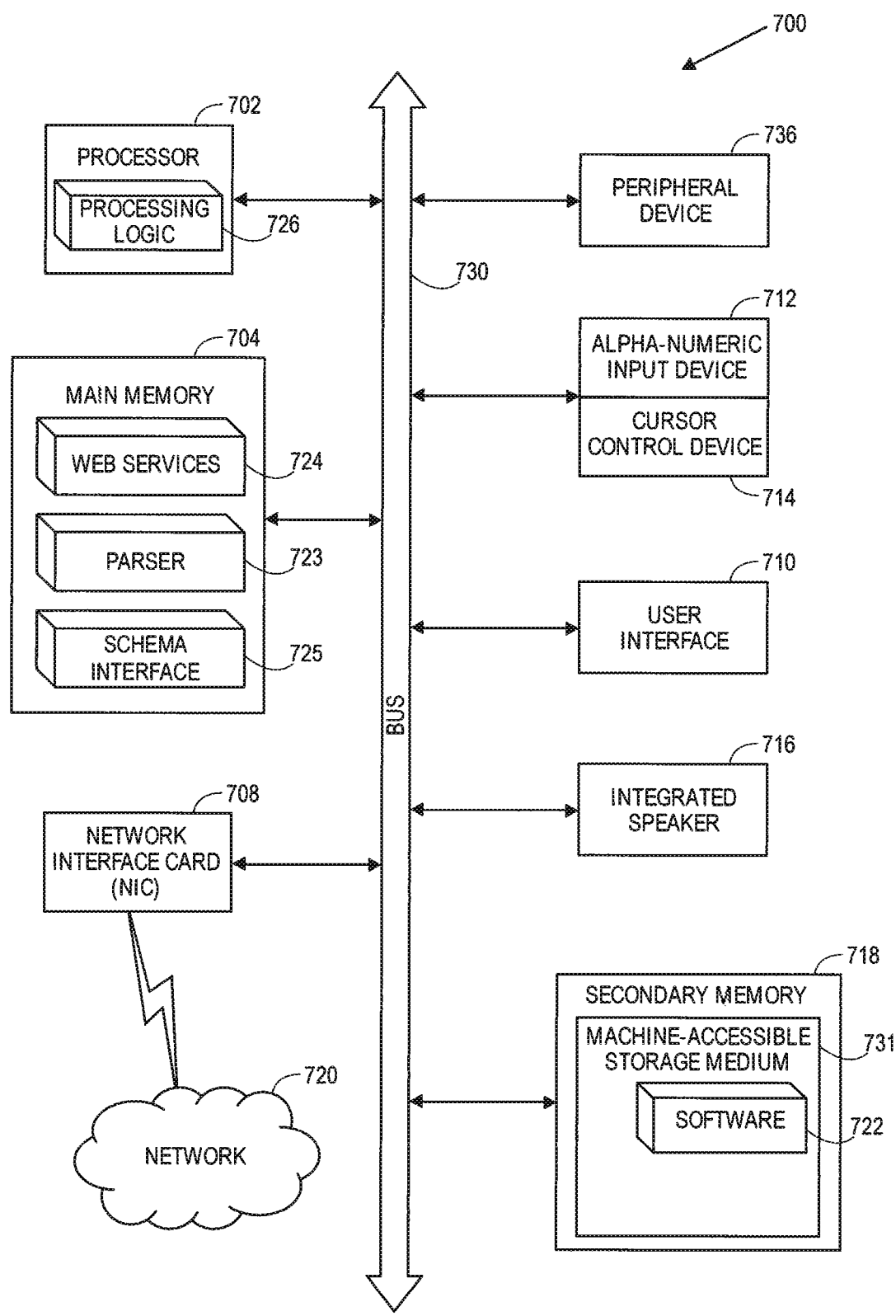
FIG. 2 illustrates a diagrammatic representation of a machine 700 in the exemplary form of a computer system, in accordance with one embodiment of the invention.

7. Illustrative Computing Environment in Accordance with Certain Embodiments FIG. 2 illustrates a diagrammatic representation of a machine 700 in the exemplary form of a computer system, in accordance with one embodiment, within which a set of instructions, for causing the machine 700 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer to peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 718, which communicate with each other via a bus 730. Main memory 704 includes information and instructions and software program components necessary for performing and executing the functions with respect to the various embodiments of the systems, methods for implementing embodiments of the invention described herein. Instructions 723 may be stored within main memory 704. Main memory 704 and its sub-elements are operable in conjunction with processing logic 726 and/or software 722 and processor 702 to perform the methodologies discussed herein.

Processor 702 represents one or more devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more devices such as an application specific integrated circuit (ASIC), a field programmable gate array (FPGA), a digital signal processor (DSP), network processor, or the like. Processor 702 is configured to execute the processing logic 726 for performing the operations and functionality which are discussed herein.

The computer system 700 may further include one or more network interface cards 708 to interface with the computer system 700 with one or more networks 720. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.).

The secondary memory 718 may include a non-transitory machine-readable storage medium (or more specifically a non-transitory machine-accessible storage medium) 731 on which is stored one or more sets of instructions (e.g., software 722) embodying any one or more of the methodologies or functions described herein. Software 722 may also reside, or alternatively reside within main memory 704, and may further reside completely or at least partially within the processor 702 during execution thereof by the computer system 700, the main memory 704 and the processor 702 also constituting machine-readable storage media. The software 722 may further be transmitted or received over a network 720 via the network interface card 708.

Some portions of this detailed description are presented in terms of algorithms and representations of operations on data within a computer memory. These algorithmic descriptions and representations are the means used by those skilled in the data processing arts to most effectively convey the substance of their work to others skilled in the art. An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system or computing platform, or similar electronic computing device(s), that manipulates and transforms data represented as physical (electronic) quantities within the computer system's registers and memories into other data similarly represented as physical quantities within the computer system memories or registers or other such information storage, transmission or display devices.

In addition to various hardware components depicted in the figures and described herein, embodiments further include various operations which are described below. The operations described in accordance with such embodiments may be performed by hardware components or may be embodied in machine-executable instructions, which may be used to cause a purpose processor programmed with the instructions to perform the operations. Alternatively, the operations may be performed by a combination of hardware and software, including software instructions that perform the operations described herein via memory and one or more processors of a computing platform.

Embodiments of invention also relate to apparatuses for performing the operations herein. Some apparatuses may be specially constructed for the required purposes, or selectively activated or configured by a computer program stored in one or more computers. Such a computer program may be stored in a computer readable storage medium, such as, but not limited to, any type of disk including optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms presented herein are not inherently related to any particular computer or other apparatus. In addition, embodiments of the invention are not described with reference to any particular programming language. It will be appreciated that a variety of programming languages may be used to implement the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices, etc.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

What is claimed is:

1. A method applied to a plurality of messages in a social media network, the method comprising:
    transmitting the plurality of messages in the social media network;
    receiving essential characteristics of social media network users in the social media network, the essential characteristics representing both local proximity and community structures detected within the social media network including an average distance between nodes and community-wise similarity among the social media network users within the local proximity and community structures detected;
    classifying propagation pathways each comprising a sequence of users via which the plurality of messages are transmitted through the social media network;
    determining a spreader of the plurality of messages spread on the social media network and classifying the plurality of messages based on (i) which social media network user spread the plurality of messages and (ii) when the social media network user spread the plurality of messages; and
    taking an action on one or more of the plurality of messages that are transmitted through the social media network based on the classification of the propagation pathways via which the plurality of messages are transmitted through the social media network and the received essential characteristics of the social media network users including the social media network user determined to be the spreader of the plurality of messages; and
    wherein taking the action on the one or more of the plurality of messages that are transmitted through the social media network based on the classification of the propagation pathways, comprises filtering out the one or more of the plurality of messages that are transmitted in the social media network over a propagation pathway that is classified as a fake news propagation pathway.

2. The method of claim 1, wherein receiving essential characteristics of social media network users in the social media network comprises receiving essential characteristics of social media network users using Large-Scale Information Network Embedding (LINE) and incorporating community information.

3. The method of claim 1, wherein classifying propagation pathways each comprising a sequence of users via which the plurality of messages are transmitted through the social media network comprises classifying the propagation pathways utilizing a Long Short-Term Memory Recurrent Neural Network (LSTM-RNN).

4. The method of claim 1, wherein classifying propagation pathways each comprising a sequence of users via which the plurality of messages are transmitted through the social media network comprises classifying the propagation pathways as one of: a pathway for spreading fake news or spam, and a pathway for spreading real news.

5. A system applied to a plurality of messages in a social media network, the system comprising:
    a processor to execute software instructions;
    a storage device in which to store the social media data;
    software instructions that when executed by the processor cause the system to:
    transmit the plurality of messages in the social media network;
    receive essential characteristics of social media network users in the social media network, the essential characteristics representing both local proximity and community structures detected within the social media network including an average distance between nodes and community-wise similarity among the social media network users within the local proximity and community structures detected;
    classify propagation pathways each comprising a sequence of users via which the plurality of messages are transmitted through the social media network;
    determine a spreader of the plurality of messages spread on the social media network and classify the plurality of messages based on (i) which social media network user spread the plurality of messages and (ii) when the social media network user spread the plurality of messages; and
    take an action on one or more of the plurality of messages that are transmitted through the social media network based on the classification of the propagation pathways via which the plurality of messages are transmitted through the social media network and the received essential characteristics of the social media network users including the social media network user determined to be the spreader of the plurality of messages; and
    wherein taking the action on the one or more of the plurality of messages that are transmitted through the social media network based on the classification of the propagation pathways, comprises filtering out the one or more of the plurality of messages that are transmitted in the social media network over a propagation pathway that is classified as a fake news propagation pathway.

6. The system of claim 5, wherein the software instructions that when executed by the processor cause the system to receive essential characteristics of social media network users in the social media network comprise software instructions that when executed by the processor cause the system to receive essential characteristics of social media network users using Large-Scale Information Network Embedding (LINE) and incorporating community information.

7. The system of claim 5, wherein the software instructions that when executed by the processor cause the system to classify propagation pathways each comprising a sequence of users via which the plurality of messages are transmitted through the social media network comprises software instructions that when executed by the processor cause the system to classify the propagation pathways utilizing a Long Short-Term Memory Recurrent Neural Network (LSTM-RNN).

8. The system of claim 5, wherein the software instructions that when executed by the processor cause the system to classify propagation pathways each comprising a sequence of users via which the plurality of messages are transmitted through the social media network comprises software instructions that when executed by the processor cause the system to classify the propagation pathways as one of: a pathway for spreading fake news or spam, and a pathway for spreading real news.

9. Non-transitory computer-readable storage media having instructions stored thereupon that, when executed a system having at least a processor and a memory therein, the instructions cause the system to perform operations comprising:
    transmitting the plurality of messages in the social media network;
    receiving essential characteristics of social media network users in the social media network, the essential characteristics representing both local proximity and community structures detected within the social media network including an average distance between nodes and community-wise similarity among the social media network users within the local proximity and community structures detected;
    classifying propagation pathways each comprising a sequence of users via which the plurality of messages are transmitted through the social media network;
    determining a spreader of the plurality of messages spread on the social media network and classifying the plurality of messages based on (i) which social media network user spread the plurality of messages and (ii) when the social media network user spread the plurality of messages; and
    taking an action on one or more of the plurality of messages that are transmitted through the social media network based on the classification of the propagation pathways via which the plurality of messages are transmitted through the social media network and the received essential characteristics of the social media network users including the social media network user determined to be the spreader of the plurality of messages; and
    wherein taking the action on the one or more of the plurality of messages that are transmitted through the social media network based on the classification of the propagation pathways, comprises filtering out the one or more of the plurality of messages that are transmitted in the social media network over a propagation pathway that is classified as a fake news propagation pathway.

10. The non-transitory computer-readable storage media of claim 9, wherein receiving essential characteristics of social media network users in the social media network comprises receiving essential characteristics of social media network users using Large-Scale Information Network Embedding (LINE) and incorporating community information.

11. The non-transitory computer-readable storage media of claim 9, wherein classifying propagation pathways each comprising a sequence of users via which the plurality of messages are transmitted through the social media network comprises classifying the propagation pathways utilizing a Long Short-Term Memory Recurrent Neural Network (LSTM-RNN).

12. The non-transitory computer-readable storage media of claim 9, wherein classifying propagation pathways each comprising a sequence of users via which the plurality of messages are transmitted through the social media network comprises classifying the propagation pathways as one of: a pathway for spreading fake news or spam, and a pathway for spreading real news.

* * * * *